Jan. 28, 1941. E. D. ARNDT ET AL 2,229,789
LEG REST
Filed May 2, 1940 2 Sheets-Sheet 1

Inventors
Emil D. Arndt
Arthur O. Robertson
By Clarence A. O'Brien
Attorney

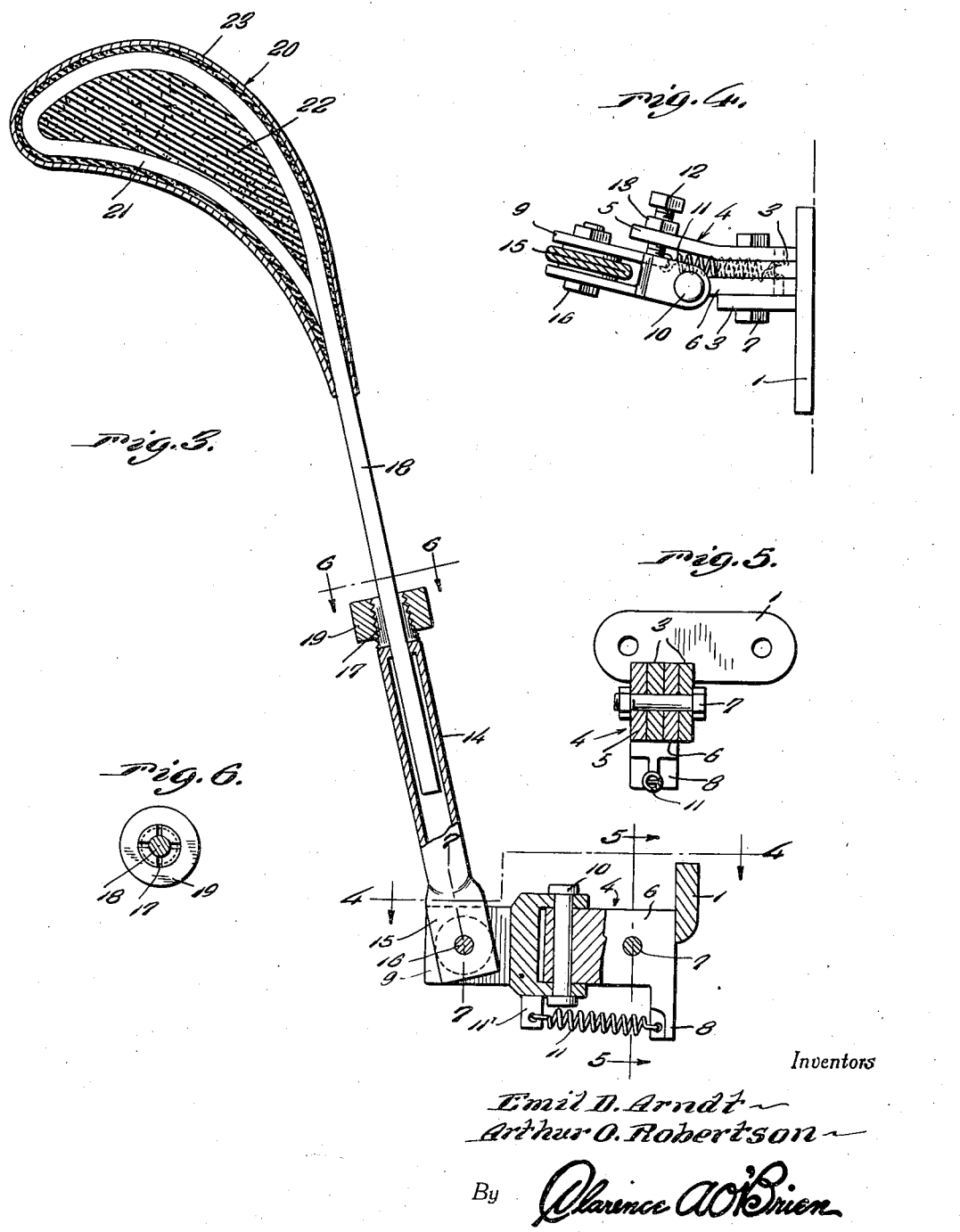

Patented Jan. 28, 1941

2,229,789

UNITED STATES PATENT OFFICE 2,229,789

LEG REST

Emil D. Arndt and Arthur O. Robertson, Durango, Colo., assignors of thirty per cent to Benjamin Thomas Poxson, Denver, Colo., and ten per cent to E. Ellison Hatfield and Frederic B. Emigh, both of Durango, Colo.

Application May 2, 1940, Serial No. 333,034

4 Claims. (Cl. 155—165)

The present invention relates to new and useful improvements in leg rests for the drivers of automobiles and has for its primary object to provide, in a manner as hereinafter set forth, a device of this character which is adapted to prevent the leg with which the accelerator pedal of the vehicle is operated from getting tired or fatigued after the vehicle has been driven for a comparatively long period of time.

Another very important object of the invention is to provide a leg rest of the aforementioned character which is capable of universal adjustment to meet various conditions.

Still another very important object of the invention is to provide a leg rest of the character described which may be expeditiously swung to an out-of-the-way position when not in use or when the operator wishes to leave the vehicle from the right hand side thereof.

A still further important object of the invention is to provide a device of the character set forth which may be conveniently adjusted to a position over the front seat of the automobile in a manner to function as a thigh rest or support.

Other objects of the invention are to provide a leg rest for automobile operators which will be comparatively simple in construction, strong, durable, highly efficient and reliable in use, compact, light in weight and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a view in vertical longitudinal section through the leg rest.

Figure 4 is a view in horizontal section, taken substantially on the line 4—4 of Figure 3.

Figure 5 is a cross sectional view, taken substantially on the line 5—5 of Figure 3.

Figure 6 is a view in horizontal section, taken substantially on the line 6—6 of Figure 3.

Figure 1:
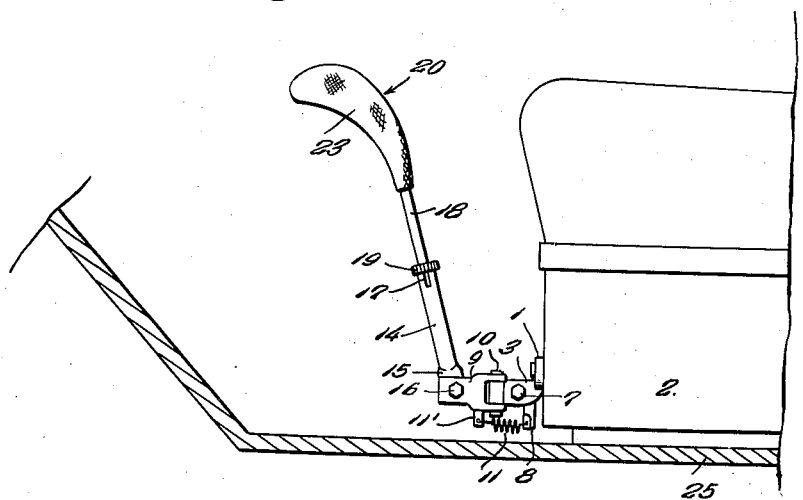
Figure 1 is a view in side elevation of an embodiment of the device, showing said device in position for use.

Referring now to the drawings in detail, it will be seen that the embodiment of the invention which has been illustrated comprises a plate 1 of suitable metal which is adapted to be firmly secured to the lower portion of the operator's seat 2 of the vehicle. Formed integrally with the plate 1 and projecting forwardly therefrom is a pair of apertured ears 3. Rigidly secured on the plate 1 is a metallic bracket which is designated generally by the reference numeral 4.

The bracket 4 includes comparatively long and short legs 5 and 6, respectively, which are spaced from each other in a manner to receive one of the ears 3 therebetween. A bolt 7 firmly secures the bracket 4 to the ears 3. Referring to Fig. 3 of the drawings, it will be observed that the inner or rear ends of the legs 5 and 6 abut the plate 1. The bracket 4 further includes a depending lug 8 which connects the legs 5 and 6 at their rear end portions.

Mounted for swinging movement on the free end portion of the comparatively short leg 6 of the bracket 4 is a substantially U-shaped clamp 9. A pivot pin 10 (see Fig. 3) connects the clamp 9 to the leg 6. The reference numeral 11 designates a coil spring having one end connected to the lug 8 and its other end connected to a depending apertured ear 11' beneath the clamp 9 for yieldingly retaining the leg rest in either operative or inoperative position. The comparatively long leg 5 of the bracket 4 is bent outwardly and has mounted therein an adjusting screw 12 which is engageable by the clamp 9 for positively limiting the horizontal swinging movement of the leg rest toward operative position. A lock nut 13 secures the stop screw 12 in adjusted position.

Pivotally mounted for swinging adjustment in the clamp 9 is a tubular arm 14. One end portion of the tubular arm 14 is flattened, as at 15, and is secured in the clamp 9 through the medium of a bolt 16 on which said tubular arm is adapted to be swung.

The tubular arm 14 terminates in a longitudinally split, externally threaded, tapered free end portion 17 for adjustably receiving an end portion of a rod 18. A tapered nut 19 is threaded on the end portion 17 of the tubular arm 14 for clamping the rod 18 in adjusted position. On the upper end of the rod 18 is a head which is designated generally by the reference numeral 20, said head being of substantially the shape shown to advantage in Fig. 3 of the drawings. The head 20 comprises a loop 21 which is formed by this end portion of the rod 18. Mounted on the loop 21 is a cushion 22 of suitable soft, resilient material, such as sponge rubber. Then, a cover 23 is provided for the cushion 22. The cover 23 is preferably, but not necessarily, of the same material as the upholstery of the automobile.

Figure 2:
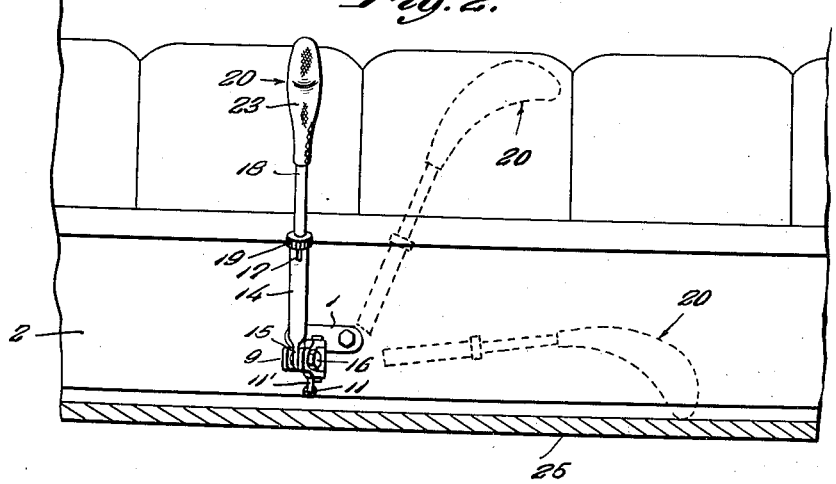
Figure 2 is a front elevational view.
Figure 7:
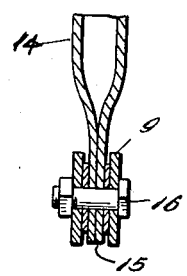
Figure 7 is a view in vertical section, taken substantially on the line 7—7 of Figure 3.

It is thought that the manner in which the device is used will be readily apparent from a consideration of the foregoing. Briefly, with the device in substantially the position shown in Figs. 1 and 2 of the drawings, the right leg of the operator of the vehicle is adapted to rest against the resilient head 20 in a manner to be comfortably supported thereby. By loosening the nut 19 the head 20 may be raised or lowered as desired. By loosening the clamp 9 the device may be swung forwardly or rearwardly on the pivot bolt 16 and secured. The stop screw 12 permits the lateral position of the device when in use to be adjusted as desired. The coil spring 11 swings the clamp 9 past dead center into engagement with the stop screw 12 when the device is moved into position for use. This is illustrated in Fig. 4 of the drawings. The head 20 may be reversed on the arm 14 and swung to a position over the seat 2 in a manner to function as a thigh rest if desired. Through the medium of the pivotal connections 10 and 16 and the adjustment 17, the head 20 may be expeditiously swung downwardly and then rearwardly when not in use to an out-of-the-way position beneath the front portion of the seat 2. Or, if the operator simply wishes to leave or enter the vehicle on the right side thereof the rest may be conveniently swung downwardly to a position adjacent the floor 25.

It is believed that the many advantages of a leg rest constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A leg rest comprising a support, a bracket mounted on said support, a clamp mounted for swinging movement in a horizontal plane on said bracket, a coil spring connected to the clamp for swinging said clamp toward operative position, an adjustable stop on the bracket for limiting the swinging movement of the clamp under the influence of the spring, a member mounted for swinging adjustment in a vertical plane on the clamp, and a cushion on said member.

2. A leg rest of the character described comprising a support, a clamp mounted for swinging movement in a horizontal plane on said support, a tubular arm mounted for swinging adjustment in a vertical plane on the clamp, a rod rotatably and slidably adjustable in said tubular arm, and a leg engaging cushion on said rod.

3. A leg rest of the character described comprising a support, a rod adjustably mounted on said support, an integral, longitudinally curved loop on one end of said rod, a cushion enclosing said loop, and a cover for said cushion.

4. A leg rest of the character described comprising a plate adapted to be mounted on a support, a bracket mounted on said plate, said bracket including spaced, comparatively long and short legs and a depending lug joining said legs at one end, a substantially U-shaped clamp pivotally mounted for swinging movement in a horizontal plane on the comparatively short leg, a tubular arm pivotally mounted for swinging adjustment in a vertical plane on said clamp, a rod mounted for rotary and sliding adjustment in said tubular arm, a resilient leg engaging head on one end of said rod, a coil spring having one end connected to the lug and its other end connected to the clamp for yieldingly securing the head in operative position, and a stop screw adjustably mounted in the comparatively long leg of the bracket and engageable with the clamp for limiting the swinging movement of said clamp toward operative position by the coil spring.

EMIL D. ARNDT.
ARTHUR O. ROBERTSON.